United States Patent

Wanner et al.

[11] 4,192,390
[45] Mar. 11, 1980

[54] POWER TOOL

[75] Inventors: Karl Wanner, Echterdingen; Wilbert Reibetanz, Leinfelden, both of Fed. Rep. of Germany

[73] Assignee: Robert Bosch GmbH, Stuttgart, Fed. Rep. of Germany

[21] Appl. No.: 874,510

[22] Filed: Feb. 2, 1978

[30] Foreign Application Priority Data

Feb. 9, 1977 [DE] Fed. Rep. of Germany ....... 2705388

[51] Int. Cl.$^2$ .............................................. B25D 17/14
[52] U.S. Cl. ........................................ 173/75; 173/57; 175/207
[58] Field of Search ..................... 173/57, 75; 175/207, 175/209, 210, 211, 213

[56] References Cited

U.S. PATENT DOCUMENTS

| 3,511,322 | 5/1970 | Bixby et al. | 173/75 |
| 3,638,737 | 2/1972 | Moates | 175/213 X |
| 3,788,423 | 1/1974 | Nittinger et al. | 175/209 X |
| 3,850,254 | 11/1974 | Hirdes | 173/75 |
| 4,064,952 | 12/1977 | Lechner | 175/209 |

Primary Examiner—Lawrence J. Staab
Attorney, Agent, or Firm—Michael J. Striker

[57] ABSTRACT

A power tool, particularly a hammer drill, is equipped with a blower which is mounted on the output shaft of the motor which drives the tool element which is clamped in the chuck of the power tool. The particulate material which is removed by the tool element from a structure is entrained in a stream of air generated by the blower and conveyed toward the latter. Before the particulate material enters the blower, at least most of it impacts an impact member which extends across an inlet section of the conduit through which the stream of air passes, so that the impact member deprives the entrained particulate material at least of the greater part of the kinetic energy possessed thereby, before the particulate material reaches the blower and damages the same due to its high kinetic energy. The particulate material entrained in the stream of air may be collected in a collecting receptacle which is detachably connected to the power tool, and a plate-shaped filter may be arranged between the space bounded by the receptacle and the downstream portion of the conduit, being supported on a grid of pins which between themselves define openings which communicate with the downstream portion of the conduit.

17 Claims, 4 Drawing Figures

POWER TOOL

BACKGROUND OF THE INVENTION

The present invention relates to a power tool in general, and especially to a power tool which is equipped with an arrangement for withdrawing particulate material from the vicinity of the tool element which is clamped in the chuck of the power tool.

Power tools of various constructions, among them hammer drills, are already known and used not only by professionals but also by do-it-yourselfers. The conventional power tools of this type used to let the particulate material removed from the workpiece or structure by the tool element escape freely into the environment. In view of the fact that the escaping particulate material, such as dust, chips or the like, will not only undesirably soil the environment of the working location, but may even create a health hazard to the user of the power tool, it has already been proposed to equip the power tool with, or to operate the power tool in conjunction with, an arrangement for collecting or confining the removed particulate material at the location where it is being removed from the structure being worked upon. In this context it has also been already proposed to equip the power tool with a blower which creates a stream of air which entrains the particulate material removed from the structure and carries it with it to a location distant from the operating location, for instance, for the particulate material to be collected at such a distant location.

Experience with this latter type of a power tool which is equipped with the blower has shown that the blower itself and the housing thereof, which are quite expensive and difficult-to-replace components of the power tool, suffer of a substantial amount of wear so that the lifespan of these components is much shorter than that of the remainder of the power tool. Experience has shown that this is attributable to the abrading or eroding action of the particulate material the particles of which may have, depending on the properties of the material of the structure being worked upon, sharp edges, especially when the material of the structure is brittle. This, of course, is very disadvantageous inasmuch as the premature wear of the blower or its housing calls either for frequent replacement of these components, at a substantial expense, or for discarding the entire power tool, which is also not economically supportable, or for the use of the power tool without the particulate material exhausting feature, which is not only inconvenient but may even be hazardous.

SUMMARY OF THE INVENTION

Accordingly, it is a general object of the present invention to avoid the disadvantages of the prior art.

More particularly, it is an object of the present invention to so improve a power tool as not to be possessed of the disadvantages of the prior art power tools.

It is a further object of the present invention to so construct the power tool as to keep the wear of the blower and the housing thereof to a minimum.

A concomitant object of the present invention is to develop a power tool equipped with an arrangement for exhausting particulate material from the vicinity of the tool element mounted in the power tool, which is simple in construction, inexpensive to manufacture and reliable in operation nevertheless.

In pursuance of these objects and of others which will become apparent hereafter, one feature of the present invention resides, in a power tool, particularly in a hammer drill, which is of the type including a motor that drives a tool element of the power tool to remove particulate material from a structure and that has an output shaft, and which may be used in conjunction with an arrangement, particularly a separate arrangement that is assemblable with the power tool, that confines the removed particulate material in a confining space around the tool element, briefly stated, in a combination comprising a blower mounted on the output shaft of the motor for joint rotation therewith; conduit means for guiding a stream of air from the confining space to and beyond said blower; means interposed in said conduit means and operative for collecting the particulate material which is entrained in said stream of air in the confining space and carried thereby through said conduit means; and intercepting means arranged in said conduit means upstream of said blower and operative for depriving the entrained particulate material at least of the greater part of the total kinetic energy possessed thereby.

When the improved power tool is constructed in the above-discussed manner, the particulate material entrained in the stream of air will enter the blower, if permitted to enter the blower at all, at a much lower speed than would be the case in the absence of the intercepting means. In this connection, it is to be mentioned that what matters in the context of the present invention is the reduction in the total kinetic energy possessed by the particulate material. In other words, it need not necessarily be that all of the individual particles of the particulate material be deprived of their kinetic energy. In other words, some of the particles may be allowed to enter the blower without being deprived of the kinetic energy thereof, so long as a predominant number of the particles is totally or predominantly deprived of their respective kinetic energy.

When the particles, in totality, enter the blower with a reduced kinetic energy, they will not subject the blower vanes or the like to such a high degree or wear as previously encountered, particularly in view of the fact that, at the reduced speeds, the particles will be much more easily influenced as to their direction of travel by the stream of air in which they are entrained.

In a particularly advantageous embodiment of the present invention, the conduit means includes an elongated inlet section which has a central axis. Then the intercepting means includes an impact member which extends radially outwardly of and substantially normal to the central axis of the inlet section.

In a currently preferred embodiment of the present invention, the impact member has a surface which faces the approaching entrained particulate material and includes a body of a soft elastomeric material, such as rubber or polyurethane, which is at least partially bounded by the above-mentioned surface. Advantageously, the above-mentioned surface is of an arcuate shape, preferably part-spherical.

According to one currently preferred concept of the present invention, the impact member assumes at least 25% of the cross-sectional area of the inlet section, and is mounted on the free end of the output shaft. It is further advantageous in the context of the present invention when the impact member is arranged at least at one of the walls which bound the conduit means, particularly at a region of merger of two consecutive sections of the conduit means which are inclined with respect to one another.

According to a further advantageous facet of the present invention the means for collecting the entrained particulate material from the stream of air is arranged in the conduit means upstream of the blower. When this expedient is resorted to, the blower and its housing, which are expensive parts of the power tool and which can be removed only with difficulty and at a great expense, are fully protected from the eroding action of the particulate material.

In this connection it is advantageous when the collecting means includes a flat plate-shaped filter which is supported on a supporting grid having a plurality of openings therein which communicate with the conduit means, the supporting grid preferably including a plurality of pins which contact one major surface of the plate-shaped filter.

It is further advantageous when the collecting means further includes a flat collecting receptacle which is arranged along and upstream of the plate-shaped filter as considered in the direction of flow of the stream of air. Then, the collecting receptacle has a bottom surface which is spacedly juxtaposed with one major surface of the plate-shaped filter, and which may have an area which at least corresponds to that of the above-mentioned one major surface. Advantageously, the collecting receptacle is detachably mounted on the power tool, such as by a hinge or a pivot arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
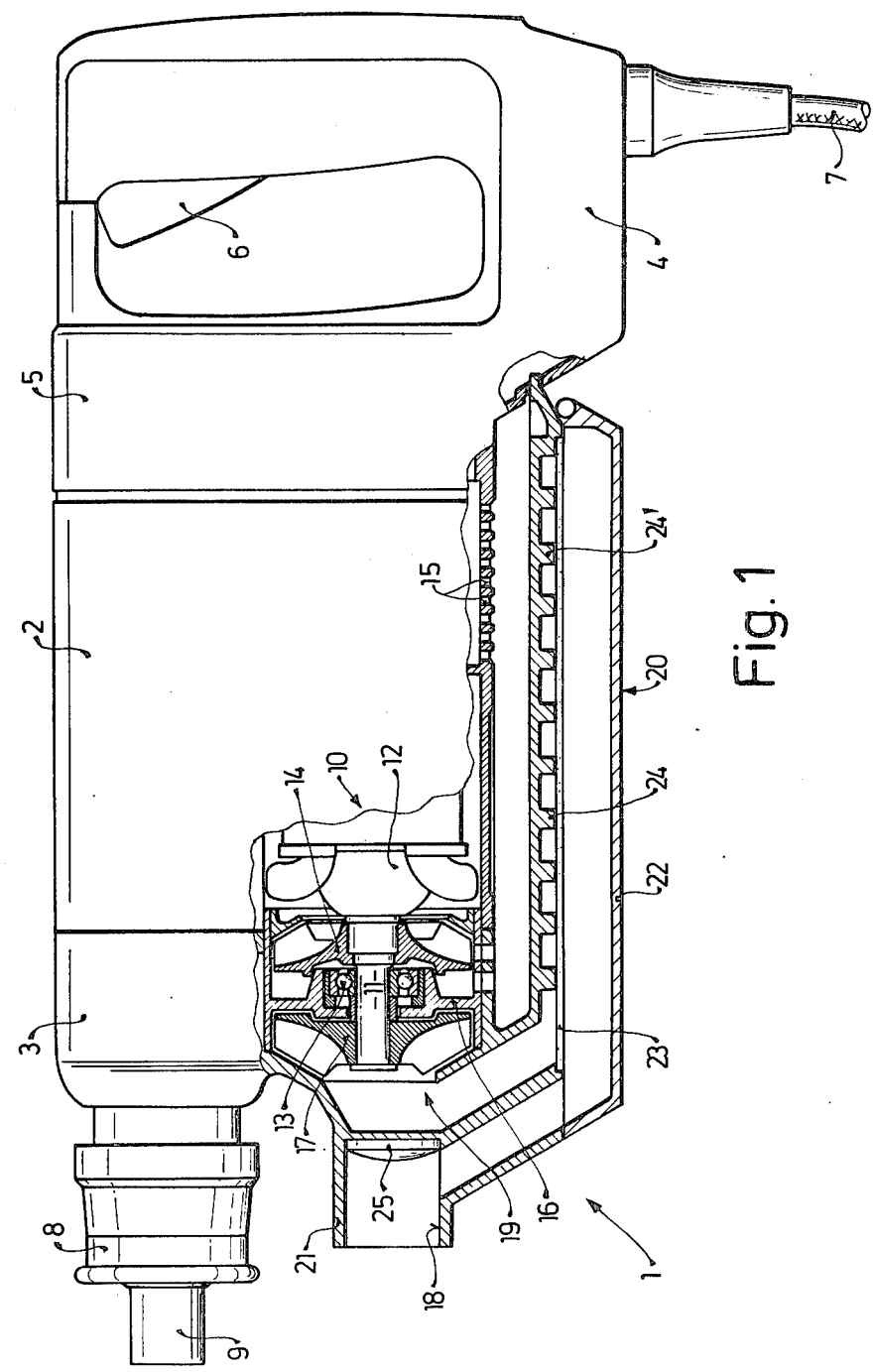
FIG. 1 is a partially sectioned side elevational view of a hammer drill improved in accordance with the present invention.

Referring now to the drawings in detail, and first to FIG. 1 thereof, it may be seen that it illustrates a power tool 1 which may be, for instance, a hammer drill. The power tool 1 has a housing which, generally speaking, consists of three parts, namely, a central portion 2, a housing lid 3 arranged at the front end of the central portion 2, and a rear portion 5 including an integrally formed handgrip 4 resembling in shape that usually found in spades, arranged at the rear of the middle portion 2. All components 2, 3 and 5 of the housing of the power tool 1 are made of an impact-resistant synthetic plastic material. A non-illustrated switch is mounted in the spade-shaped handgrip 4 and has a trigger 6 which, when actuated, will operate the switch and thus set the power tool 1 in operation. At the lower end of the spade-shaped handgrip 4, an electrical cable 7 is introduced into the interior of the handgrip 4 through an elastic sleeve. A tool-holding arrangement or chuck 8 is arranged at the forward end of the power tool 1 which is remote from the spade-shaped handgrip 4, the chuck 8 serving to receive one of a multitude of tool elements, such as drills or chisels, a part of one of which has been diagrammatically illustrated in the drawing and designated with the reference numeral 9.

An electrical driving motor 10, such as, for instance, a universal motor, is arranged in the lower region of the central portion 2 of the housing of the power tool 1, and includes an output shaft 11 and a rotor 12 which is mounted on the output shaft 11 for rotation therewith. The output shaft 11 of the rotor 12 is mounted in the central portion 2, in a conventional manner, at both ends by anti-friction bearings of which only the frontward one has been illustrated in the drawing and designated with the reference numeral 13. A blower wheel 14 is mounted on the output shaft 11 between the rotor 12 and the anti-friction bearing 13, the blower wheel 14 generating a stream of air for cooling the driving motor 10. Air-discharging slots 15 are provided at the region of the central portion 2 which is adjacent to the rear portion 5, and at the lower side of the central portion 2 as considered in the drawing, through which the cooling air can again be discharged into the ambient atmosphere.

The output shaft 11 of the driving motor 10 extends beyond the anti-friction bearing 13 to the side of the latter which is opposite to the location of the rotor 12 on the output shaft 11. The free end of the shaft 11 is supported in a bearing plate 16 which also partially bounds and encloses the interior of the driving motor 10. The free end of the output shaft 11 extends through the bearing plate 16, being received in an opening of the bearing plate 16. Another blower wheel 17 is mounted on the free end of the output shaft 11 of the driving motor 10 for joint rotation therewith. The blower wheel 17 is a component of an arrangement for exhausting the particulate material removed from a support structure by the action of the tool element 9.

The arrangement for exhausting the removed particulate material further includes a suction conduit 18, a blower unit 19 which includes the blower wheel 17 and communicating with the suction conduit 18, and the arrangement 20 for collecting the particulate material. The suction conduit 18 is partially bounded by an inlet nipple 21 which is arranged in an axial parallelism with the tool element 9. The inlet nipple 21, as well as the blower 19, are integrated in the front housing lid 3 of the power tool 1. At the inner end of the inlet nipple 21 which is closer to the power tool 1, the suction conduit 18 extends at the inclination of approximately 75° with respect to the axis of the inlet nipple 21 and downwardly and leads into the collecting arrangement 20. The collecting arrangement 20 incorporates a flat collecting receptacle 22 which is pivotally mounted on the power tool 1 at its rear end which is closer to the spade-shaped hand grip 4. The upper side of the collecting receptacle 22 is delimited by a plate-shaped filter 23 which abuts a grid-shaped support 24 which is constituted by individual projecting pins 24'. At the rear major surface of the plate-shaped filter 23 which faces away from the collecting receptacle 22, the suction conduit 18 continues toward the blower 19 and opens centrally into the blower wheel 17. Non-illustrated outlet slots are provided in the outer wall of the housing lid 3, being distributed about the interference of the blower wheel 17 and permitting the air impelled by the blower wheel 17 to be discharged to the exterior of the power tool 1.

At the entrance of the suction conduit 18 into the exhausting arrangement, as illustrated in FIG. 1, at the inner end of the inlet nipple 21, there is provided an impact member 25 which extends radially outwardly from the central axis of the inlet nipple 21 and extends substantially normal to such a central axis. The impact member 25 has a slightly arcuate or part-spherical configuration and consists of a soft elastomeric material, such as rubber or polyurethane.

A non-illustrated arrangement for confining the removed particulate material to the vicinity of the drawing or impacting tool 9, which may be separate from and assemblable with the power tool 1, may be communicatingly connected to the inlet nipple 21. This separate assemblable arrangement can include, for instance, a conventional rinsing head which surrounds the tool element 9 and which communicates with the inlet nipple 21 via a suction channel. However, this arrangement may as well include a confining receptacle or bell which surrounds the tip of the tool element 9 at the working location. Assemblable arrangements of this type are already known and revealed, for instance, in the German patent application No. P 25 48 100.9.

When the driving motor 10 is put in operation, and provided that the power tool 1 is constructed as a hammer drill, a rotary and an impacting motion can be imparted to the chuck 8 and thus to the tool element 9 held therein, in a manner which is conventional and thus has not been illustrated. The particulate material which is dissociated by the tool element 9 from the support structure at the working location will be exhausted or withdrawn from the working location by resorting to the use of one of the above-mentioned confining arrangements or any other known arrangement which is connected to the inlet nipple 21. The stream of air which is generated during the operation of the blower unit 9, that is, during the rotation of the output shaft 11 of the motor 10, entrains the particulate material and carries the same at a substantial speed into the suction conduit 18. As a result of the inertia of the particulate material, the latter does not participate in the sharp turn which the stream of air makes at the inner end of the inlet nipple 21 and thus hits the impact member 25. Thus, the kinetic energy which is possessed by the particulate material particles travelling through the suction conduit 18 is transmitted, to a great degree, to the impact member 25. From there, the particles of the material travel into the collecting receptacle 22 and the larger-dimensioned particles come immediately to rest at the bottom of the collecting receptacle 22. The finer, lighter particles of the particulate material are collected from the advancing stream of air by the plate-shaped filter 23.

Experience with this arrangement has shown that the kinetic energy which is still possessed by the particles of the particulate material after the contact thereof with the impact member 25 is insufficient for causing any pronounced erosion damage to the surfaces bounding the suction conduit 18, the collecting receptacle 22 or the plate-shaped filter 23.

The modification which is illustrated in FIG. 2 may again be used in a hammer drill or a similar hand-held tool. This modification is in many respects similar to the arrangement illustrated in FIG. 1; the only important difference resides, basically, in a different course of the suction conduit. Thus, the same reference numerals as those used in FIG. 1 have been used to indicate similar parts in FIG. 2. The power tool 1 of FIG. 2 also has a tripartite housing, and the chuck 8 is again provided on the forward side of the housing, being capable of clamping a tool element 9 therein. The reference numeral 43 identifies the forward housing lid, and the lid 43 is formed with an inlet nipple 61 in the same manner as the inlet nipple 21 is formed on the lid 3 of FIG. 1. Here again, a separate arrangement for confining the particulate material removed from a structure, which is separate from and assemblable with the power tool 1, can communicate with the inlet nipple 61 in the same manner as described previously. A suction conduit 58 passes through the interior of the inlet nipple 61, the suction conduit 58 coaxially opening onto a blower wheel 57. Similarly to the above-discussed arrangement, the blower wheel 57 again is mounted on the free end of an output shaft 51 of a driving motor 50 of the power tool 1. Here again, an impact member 65 is provided which has a part-spherical outer contour, this time being mounted, however, at the free end face of the output shaft 51 which faces into the suction conduit 58. This impact member 65 has, similarly to the impact member 25 of FIG. 1, an exposed surface which is provided on a body consisting of a soft elastomeric material and faces the approaching particulate material. A conduit 66 which, this time around, conducts a stream of a pressurized air, commences at the periphery of the blower wheel 57, the conduit 66 opening into a collecting receptacle 62 which is structurally almost identical to the collecting receptacle 22 according to FIG. 1. Here again, a plate-shaped filter 63 is provided at the upper side of the collecting receptacle 62, being supported on a grid-shaped support 64. Outlet slots 67 are provided at the upper side of the support 24 which faces away from the plate-shaped filter 63 so that the pressurized air can escape therethrough into the ambient atmosphere.

Figure 2:
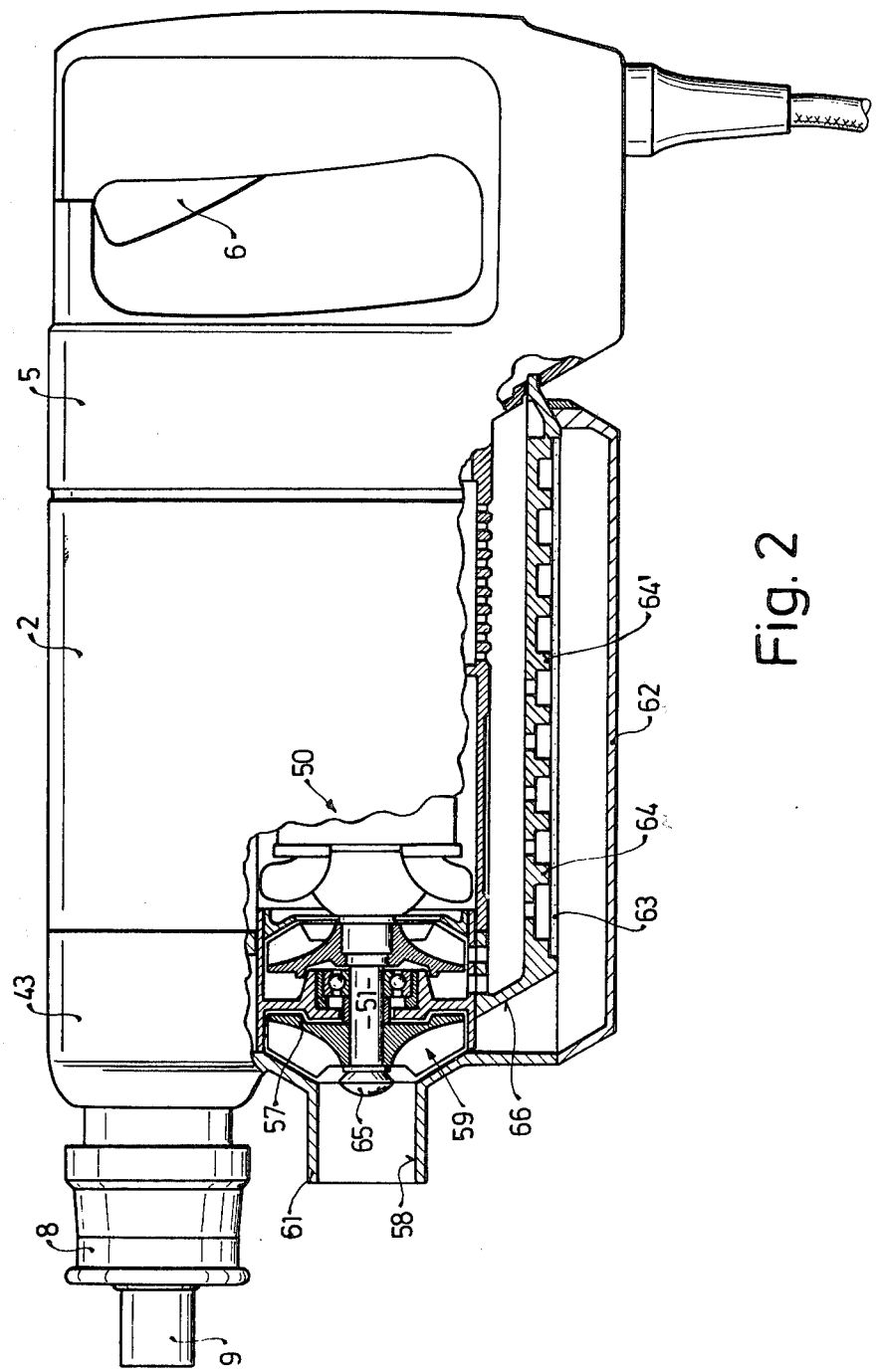
FIG. 2 is a view similar to FIG. 1 but illustrating a modification of the basic concept of the present invention.

The operation of the arrangement of FIG. 2 is as follows: The particulate material which is entrained and carried by the air stream in the same manner as described in connection with FIG. 1 into the suction conduit 58 hits the impact member 65 and transmits the part of its kinetic energy thereto. Even though the impact member 65 assumes only approximately 30% of the cross-sectional area of the suction conduit 58 in the inlet nipple 61, the predominant part of the approaching particulate material will hit the impact member 65. This is attributable to the fact that, as a concomitant of the streamlined flow which will develop in the vicinity of the suction conduit 58 with an increasing speed of flow of the air toward the central axis of the suction conduit 58, the amount of the particulate material carried by the air stream through various regions of the cross-section of the suction conduit 58 per unit of time will increase with the increasing closeness of the cross-sectional region to the axis of the suction conduit 58 so that by far the greatest number of the particles of the particulate material will be conveyed through the regions which are close to the central axis of the suction conduit 58.

Figure 3:
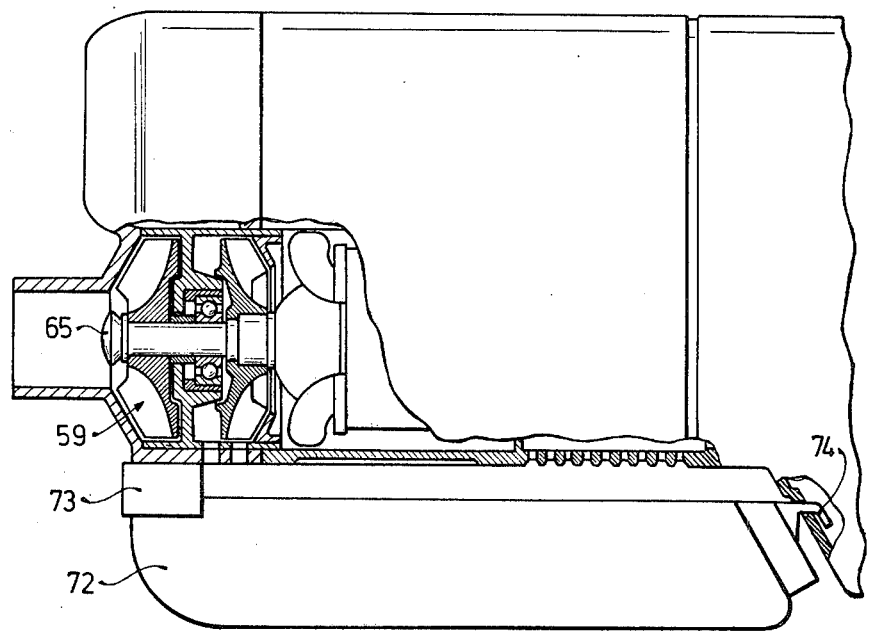
FIG. 3 is a view similar to that but showing only a fragment of FIG. 1 and illustrating a further modification of the basic concept.

The modified arrangement of the present invention which is depicted in FIG. 3 differs from the above-discussed arrangements in that a collecting bag 72 is arranged at the outlet of the suction unit 59 instead of the above-mentioned rigid collecting receptacle 22 or 62. The collecting bag 72 is connected to the front lid 43 by means of a conventional bayonett-type connector 73 which has only been illustrated in a diagrammatic fashion. Here again, the suction or blower unit 59 is accommodated within the lid 43. On the other hand, the rear end of the bag-shaped collecting receptacle 72 is connected to the rear housing portion 5 (see FIG. 1) by means of a hook 74 which is received in the wall of the above-mentioned rear housing portion 5. As to its operation, the arrangement of FIG. 3 which incorporates the collecting bag 72 is the same as the above-discussed arrangements.

When it is desired to empty the collecting bag 72 of its contents, the connection 73 of the bag-shaped receptacle 72 to the lid 43 is released, whereupon the accumulated particulate material can be removed from the interior of the collecting bag 72. On the other hand, in the arrangements discussed previously in connection with FIGS. 1 and 2, the flat, plate-shaped, rigid collecting receptacle 22 or 62 is swivelled or otherwise detached from the housing of the power tool 1, whereupon the accumulated particulate material can be discharged therefrom. However, inasmuch as the plate-shaped filter 23 or 63 is less expensive and more durable than the collecting bag 72, which is usually made of fabric (warp and filling), preference will usually be given to the arrangements of FIGS. 1 and 2 over that of FIG. 3. With respect to the durability or lifespan of the blower wheel 17, the best results are achieved with the arrangement of FIG. 1; however, the construction of the suction channel 18 of this arrangement is somewhat more complicated and thus more expensive than that in the arrangements of FIGS. 2 and 3.

Figure 4:
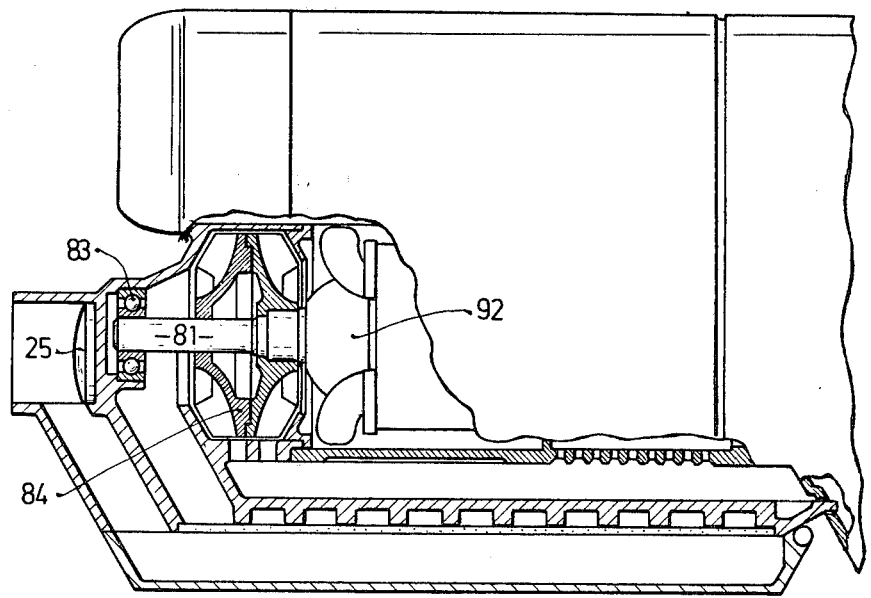
FIG. 4 is a view similar to FIG. 3 but showing a still different modification of the basic concept.

Finally, the modified arrangement illustrated in FIG. 4, which again may be embodied in a power tool 1, such as a hammer drill, corresponds as to its basic details to that of FIG. 1. However, a substantial simplification of the structure is achieved in this power tool in that a double blower wheel 84 is being used instead of the individual blower wheels 14 and 17 of FIG. 1. This double blower wheel 84 is again mounted for joint rotation on an output shaft 81. As a result of this construction, a two-path blower arrangement is obtained to a certain extent. The separating wall 16 which is present in FIG. 1 can be dispensed with in this arrangement. Here, the output shaft 81 is supported in an anti-friction bearing 83 which is arranged directly behind the impact member 25. However, it is to be understood that the anti-friction bearing 83 could as well be arranged between the rotor 92 and the double-blower wheel 84.

It will be understood that each of the elements described above, or two or more together, may also find a useful application in other types of constructions differing from the types described above.

While the invention has been illustrated and described as embodied in an improved hammer drill, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that from the standpoint of prior art, fairly constitute essential characteristics of the generic or specific aspects of this invention.

What is claimed as new and desired to be protected by Letters Patent is set forth in the appended claims.

1. In a power tool, which is of the type including a motor that drives a tool element of the power tool to remove particulate material from a structure and that has an output shaft, and which may be used in conjunction with an arrangement, particularly a separate arrangement that is assemblable with the power tool, that confines the removed particulate material in a confining space around the tool element, in a combination comprising a blower mounted on the output shaft of the motor for joint rotation therewith; conduit means for guiding a stream of air from the confining space to and beyond said blower, said conduit means including an elongated inlet section which has a central axis and in which a free end of the output shaft is located; means interposed in said conduit means and operative for collecting the particulate material which is entrained in said stream of air in the confining space and carried thereby through said conduit means; and intercepting means arranged in said conduit means upstream of said blower and operative for depriving the entrained particulate material at least of the greater part of the total kinetic energy possessed thereby, said intercepting means including an impact member extending radially outwardly of and substantially normal to said central axis of said inlet section, said impact member being mounted on the free end of the output shaft.

2. A combination as defined in claim 1, wherein said impact member assumes only a part of the cross-sectional area of said inlet section so that the remainder part of the same remains free, whereby after hitting of said impact member the entrained particulate material travels through said remainder part.

3. In a power tool which is of the type including a motor that drives a tool element of the power tool to remove particulate material from a structure and that has an output shaft, and which cooperates with an arrangement for exhausting the removed particulate material, a combination comprising a blower mounted on the output shaft of the motor for joint rotation therewith; conduit means for guiding a stream of air with the particulate material entrained therein to said blower; and means for collecting the entrained particulate material from the stream of air arranged in said conduit means upstream of said blower, said collecting means including a flat plate-shaped filter, and means for supporting said plate-shaped filter, said supporting means including a supporting grid having a plurality of openings therein which communicate with said conduit means.

4. A combination as defined in claim 3, wherein said conduit means includes an elongated inlet section having a central axis, and including an impact member extending radially outwardly of and substantially normal to said central axis of said inlet section.

5. A combination as defined in claim 4, wherein said impact member has a surface facing the approaching entrained particulate material and includes a body of a soft elastomeric material at least partially bounded by said surface.

6. A combination as defined in claim 5, wherein said elastomeric material is rubber.

7. A combination as defined in claim 5, wherein said elastomeric material is polyurethane.

8. A combination as defined in claim 4, wherein said impact member has a surface facing the approaching entrained particulate material and being of an arcuate shape.

9. A combination as defined in claim 8, wherein said shape of said surface is part-spherical.

10. A combination as defined in claim 4, wherein said impact member assumes at least 25% of the cross-sectional area of said inlet section.

11. A combination as defined in claim 4, wherein said conduit means includes a plurality of walls; and wherein said impact member is immovably mounted at least at one of said walls.

12. A combination as defined in claim 11, wherein said walls define two consecutive sections of said conduit means which are inclined with respect to one another; and wherein said one wall and said impact member are located at a region of merger of said consecutive sections.

13. A combination as defined in claim 3, wherein said supporting grid includes a plurality of pins which contact one major surface of said plate-shaped filter.

14. A combination as defined in claim 3, wherein said collecting means further includes a flat collecting receptacle arranged along and upstream of said plate-shaped filter.

15. A combination as defined in claim 3, wherein said collecting means has a bottom surface spacedly juxtaposed with one major surface of said plate-shaped filter; and wherein said bottom surface has an area which at least corresponds to that of said one major surface.

16. A combination as defined in claim 14, wherein said collecting means further includes means for detachably mounting said collecting receptacle on the power tool.

17. In a power tool which is of the type including a motor that drives a tool element to remove particulate material from a structure and that has an output shaft, and which cooperates with an arrangement for exhausting the removed particulate material, a combination comprising a blower mounted on the output shaft of the motor for joint rotation therewith; conduit means for guiding a stream of air with the particulate material entrained therein to said blower; and means for collecting the entained particulate material from the stream of air arranged in said conduit means upstream of said blower, said collecting means including a flat plate-shaped filter, a flat collecting receptacle arranged along and upstream of said plate-shaped filter, and means for detachably mounting said collecting receptacle on the power tool and including a hinge.

* * * * *